Jan. 23, 1962  O. J. MUNZ  3,017,857
SEA FARMING
Filed Dec. 21, 1959  3 Sheets-Sheet 1

SECT "A-A"

INVENTOR
Otto John Munz.

Jan. 23, 1962     O. J. MUNZ     3,017,857
SEA FARMING
Filed Dec. 21, 1959     3 Sheets-Sheet 2
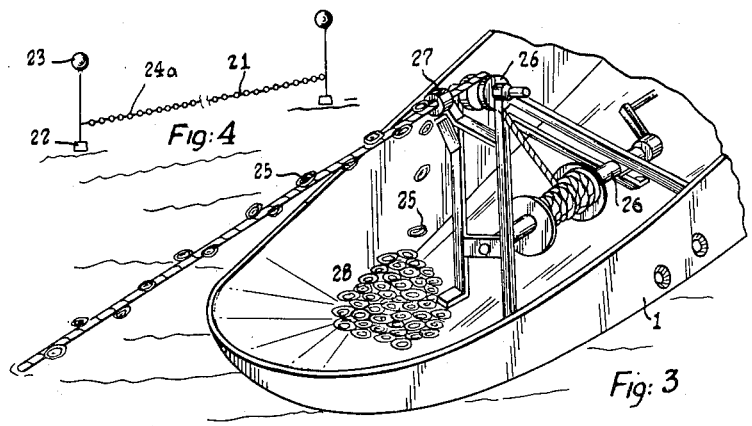
Fig. 4
Fig. 3
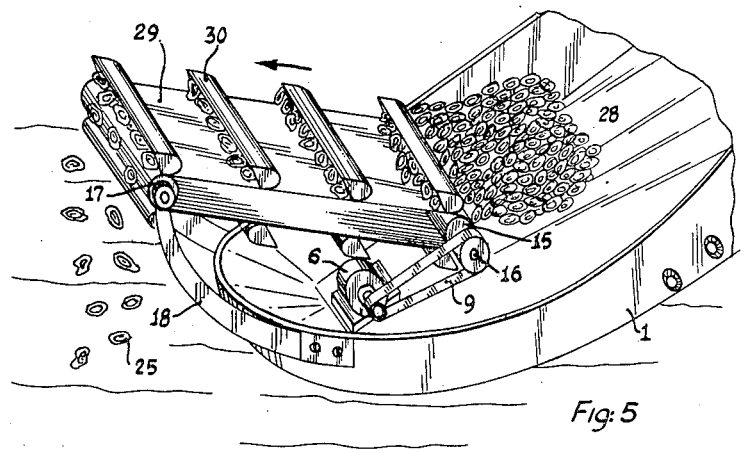
Fig. 5
INVENTOR
Otto John Munz

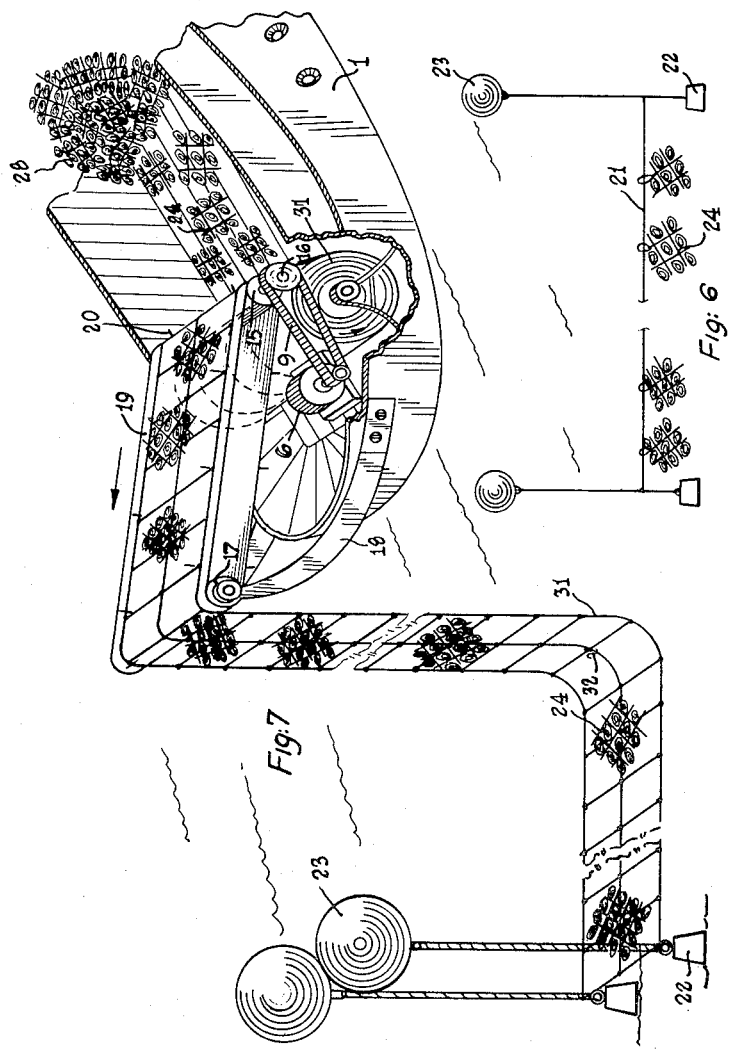

United States Patent Office 3,017,857
Patented Jan. 23, 1962

3,017,857
SEA FARMING
Otto John Munz, Rte. 3, Harness Creek, Annapolis, Md.
Filed Dec. 21, 1959, Ser. No. 861,049
21 Claims. (Cl. 119—4)

The invention relates to sea farming and more particularly to mass production of seed of mollusks, such as bivalves and in particular, oysters, to oyster-seed harvesting, to oyster-seed planting and to harvesting and planting machinery and methods.

Up to the present, only small scale manual methods are employed to grow oyster-seed. Background materials, called cultch, such as ceramic tiles, oyster shells and the like are placed into oyster beds during the oyster spawning season. After oyster-seed attaches itself to the cultch and grows there to a size approximately from 1/4" up, the cultch is laboriously taken out, or "tonged," by haphazard methods.

The young oysters either manually scraped off the cultch, or with the old oyster shell to which they are attached, are thrown overboard into future artificial oyster beds. There some of the seedlings find new solid favorable background material to which they attach themselves and the rest of the seedlings perish. An oyster shell carries up to 25 oyster seeds, but only a few would have enough space there to develop properly.

It is an object of this invention to introduce to oyster farming progressive methods which allow for efficient mass production. Another object of the invention is to provide a novel cultch and novel means of its distribution in the oyster spawning grounds mechanically and to provide simultaneously large cultch areas for seed growing within a limited acreage of spawning grounds.

Another object of the invention is to provide a cultch carrying material which is flexible to allow for its mechanical rolling on and unrolling from a distributing machine and which has solid hard cultch portions after immersion into water to provide a suitable background material for the oyster-seed.

Another object of the invention is to provide a cultch carrying material which, after the oyster seed has grown on it, is mechanically collected and mechanically cut into small parts with only a few oyster-seeds attached on each part for reseeding.

Another object of the invention is to provide a seeding unit comprising oyster-seed attached to artificial cultch for reseeding purposes.

Another object of the invention is to provide a novel cultch comprising oyster growth promoting materials.

Another object of the invention is the method of manufacturing cultch carrying fabric comprising materials favorable for oyster growths and permitting the cultch distribution in a dry flexible state with only portions solid or hardening after immersion.

Another object of the invention is to provide a cultch distributor, an oyster-seed harvester, an oyster-seed separator and an oyster-seed farming drill.

Other objects of the invention will become apparent from the following description and drawings, in which:

FIGURE 3 is a perspective view showing an embodiment of the invention utilizing a single line of cultch.

FIGURE 4 is a perspective view showing a method of suspending a single line of cultch.

FIGURE 5 is a perspective view of the equipment in part in use as an ocean-seed drill.

FIGURE 6 is a side elevation of another suspension system for seeding the cultch.

FIGURE 7 is a perspective view of still another embodiment whereby cultch may also be seeded.

Figures 1, 2:
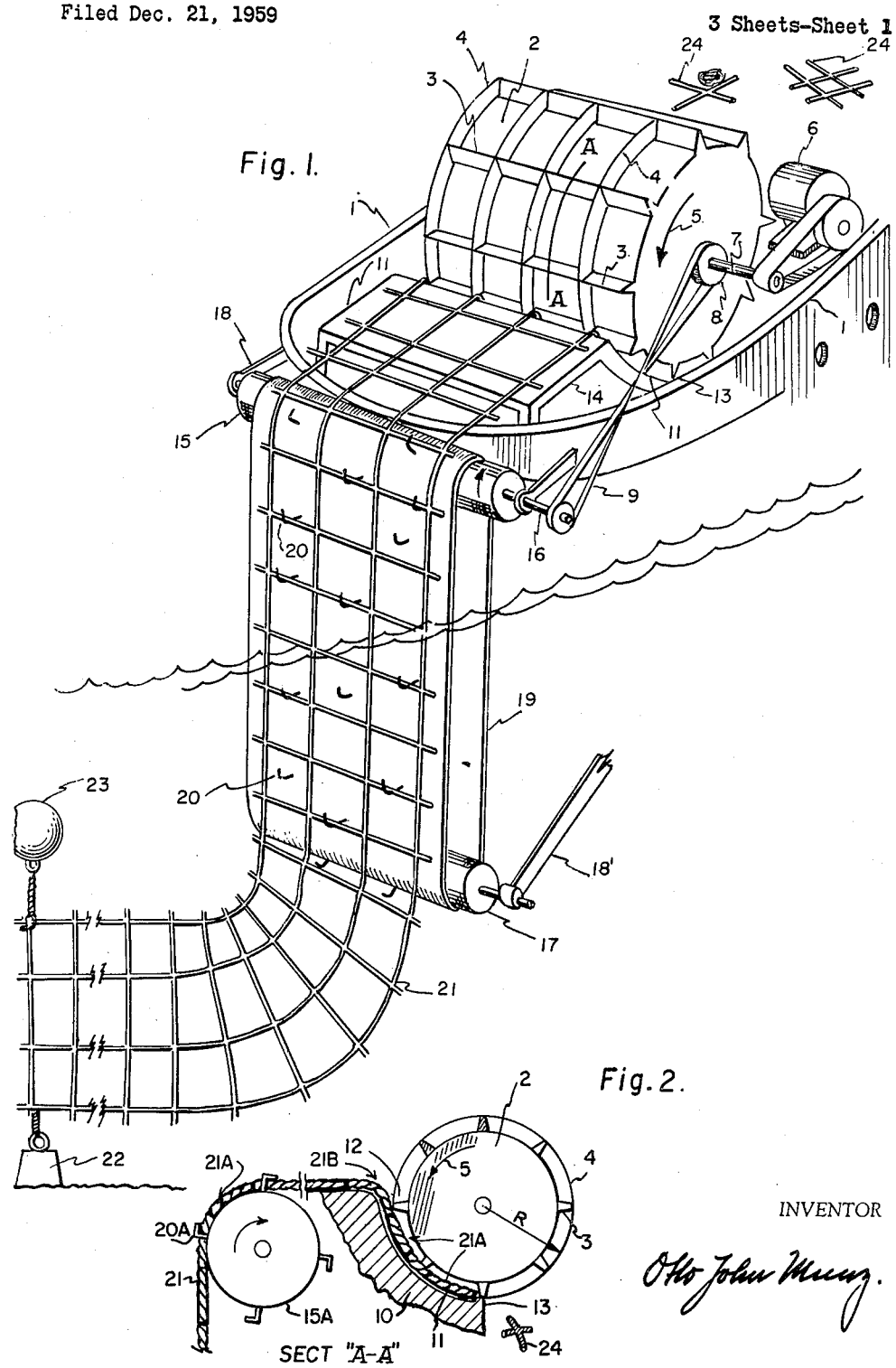
FIGURE 1 is a perspective view of the cultch distributor, oyster-seed harvester and cultch separator.
FIGURE 2 is a cross-sectional side view of portion of FIGURE 1 along lines A—A, including a modification of a detail.

A vessel 1, is equipped with a stamping drum 2, having a multiplicity of spaced removable stamping edges, lateral, 3 and circumferential 4. The drum is rotated in the direction of arrow 5 by a source of power 6. Its shaft 7 is provided with a reversible power take-off comprising sheave 8 and belt 9. The drum is removable and supported in bearings for rotation.

Adjacent to the stamping drum on the deck of the vessel at a controlled distance from the stamping edges of the drum is mounted fixedly and removably a stamping table 10, having a cylindrical concave stamping surface 11, curved adjacent to the stamping edges.

The radius of the drum and the radius of the cylindrical stamping surface of the stamping table are shown to be the same, however the center of the drum is eccentrically oriented relative to the center of the concave surface of the stamping table, so that there is a clearance 12 between the two, decreasing in the direction of arrow 5 to null at point 13. The stamping table has a forwarding platform 14. A conveyor 15, is attached to the outside of the vessel and comprises a drive shaft 16, connected to a source of power, for instance by belt 9. A freely rotating lower cylinder is supported controllably below the drive shaft. An endless belt 19, provided with grappling hooks 20, spaced on it, runs over the two cylinders 15 and 17. The conveyor 15a of FIGURE 2 has the hooks 20a attached thereto rather than to the belt 19 as in FIGURE 1.

A spawning net 21 is suspended in the sea, during the oyster spawning season, by anchors 22 and buoys 23 for a time sufficient for the oyster spawn to attach itself to it and to grow there into seed. At the beginning of the seed harvesting operation one end of the net is connected to the grappling hooks of the endless belt, and the net with the oyster-seed is drawn mechanically upwards over the platform 14 into the clearance 12. There the net engages with the edges of the drum, the continuous rotation of the drum increases the gripping engagement of the stamping edges which continue to draw the net in, as it is forwarded by the endless belt. At a point near 13, the gripping force turns into a stamping action, cutting the net radially and transversely into predetermined sections, such as crosses or squares 24. The thickness of the net fabric preferably is at least equal to the clearance between the cutting edges of the drum and the stamping surface at point of engagement 12. The radial height of the cutting edges preferably is at least equal to the combined diameter of the fabric thread and of the average size oyster seed attached to it. The rotation of the drums and the frictional gripping of its stamping edges draws the net into the clearance 12 to 13. A small percentage of the oyster-seed interfering with the cutting edges is crushed, the oyster-seed on the sections however remains intact. The position of the drive shaft 16 and of the lower cylinder 17 may be controlled relative to each other in order to adjust the tightness of the endless belt, and relative to the vessel to control the height and position of the endless belt relative to the drum by braces 18 and 18' respectively. The braces have conventional pivoting and telescoping means.

The net is shown with three squares laterally and the stamping edges in the drawing correspond to the three squares, for purposes of demonstration only. An increased number of net squares and of corresponding cutting edges may be employed. The cultch is not limited to a net structure.

The stamping edges may be removably attachable so that when taken off, the drum may serve as storage means for uncoiling a length of fabric overboard into the spawning grounds. The drum stripped of its stamping edges also may be used for disposing overboard of a strip of netting with sections of cultch fastened on it for reseeding, as discussed elsewhere in this disclosure. The stripped drum may be used for uncoiling or coiling of a single line-cultch. The cutting process is accomplished by conventional apparata and methods with cutters making longitudinal and transverse cuts simultaneously or in close sequence, while the fabric is conveyed to them over rollers, conveyor belts, reciprocating fingers or by other conventional means, or the cutting is done manually.

The cultch holding material of the present invention preferably is a continuous strip of fabric of a length of up to hundreds of feet, limited only by the carrying capacity of the vessel and by the size of the spawning grounds. The width of the cultch holding material ranges from a single strand to nets or other fabrics, several feet wide.

The cultch holding material of the present invention is made from materials metallic and/or textile, permitting folding or rolling. The material must have durability and tensile strength in water which enables it to carry the load of oysters grown on it. In a preferred embodiment of the invention the material is impregnated by organic and inorganic materials hereinafter discussed.

Among the materials suitable for cultch fabric are: organic fibers such as: Cotton; jute; sistal; hemp; wood; cellulosic compounds; artificial fibers, synthetic resins, plastics, metal wire, fiber-glass, asbestos and similar, and any combinations thereof capable of producing a flexible fabric. Open mesh netting is preferable, since the oyster-seed distributes itself on it thinly over a wide area and stacking of rows of netting over the oyster grounds during spawning is feasible.

The fabric is provided with materials, which stiffen it into cultch portions to provide a solid background, attractive for the oyster spat and for the oyster-seed to grow on it. Optionally conventional additives are included at least in trace amounts into the fabric and cultch to make the fabric elastic, water repellent, to prevent its decay, to repel parasites, to attract the seed to the cultch and to stimulate the growth of the oysters.

Among the materials suitable for cultch purposes are $CaCO_3$, commercial cements, cementitious materials having as principal compounds di-calcium silicate, tri-calcium aluminate, calcium sulphate, powdered limestone, asbestos, kaolin, polymerizing plastics such as methyl metacrylate, and the like. The additives to cultch are mineral and metal salts, such as lead salt, barium sulfate, iodine, phosphorus, copper in at least traceable amounts, at least 5% of the total weight of the mixture of materials having elastomeric properties and the additives to the fabric are anti-rotting and water repellent materials, in conventional amounts.

Three preferred methods by which the impregnator is applied to the fabric are now described:

A. The impregnating and additive materials preferably are mixed with additives having elastomeric properties into a liquid or plastic slurry and the porous fabric immersed therein, drawn through it, and dried.

The slurry preferably is composed of a mixture of an agent comprising $CaCO_3$, such as natural or Portland cement, with a polymerizing plastite such as methyl metacrylate, a polystyrene or styrene co-polymer, or an epoxy resin, each with a catalyst. Preferably the fabric is dipped into this plastic slurry only at equidistant points and when the fabric is in the shape of a netting, preferably at its intersections only.

B. The impregnating materials and additives are directly incorporated into a liquid or plastic resinous or polymerizing slurry from which the fabric is extruded. In a preferred embodiment the invention utilizes the properties of commercial hydraulic cements to cure while immersed in water for an extended period of time.

C. The impregnator ground to a fineness for example where approximately 90% passes a 320 mesh sieve, is admixed to the fiber in one or more of the early stages of the spinning. The following procedures are feasible:

(1) The fibers are spun with the impregnator admixed to them. The process starts with raw fibers, such as cotton, and during the blending process, a percentage of uncured powdered cement is admixed. Thus while the fibers are processed through the equipment in conventional stages, pick and blend, carding, roving, spinning, twisting-plying, cement is admixed, preferably in the early stages, but not later than at the roving stage. Additives are admixed, such as malt extract resins, adhesives, etc., to aid in retaining a greater portion of the cement in the fiber and to prevent the cement from dusting out. The resultant yarn is then woven or knitted to obtain the finished fabric.

To cause adherence of cement to the selected spots, preferably intersections, in a netting having a smooth glassy surface, such as made from fiberglass, or polymerized resins, nylon, etc., which normally reject a cement coating, a thermosetting, polymerizing or thermoplastic liquid resin etc., is used.

Liquid resin which hardens to a hard mass and is capable of bonding to glassy fibers is used. The plastic is resistant to the high alkalinity of the cement during the hardening period of the cement. A particulate material, such as sand, cement particles, oyster shell fragments, iron filings or other hard particulate material is adhered to the surface of the resin impregnated core before the resin hardens. When the resin hardens, the particulate material is firmly bonded to and the particles project out of, the plastic.

In order to increase the surface of the spot on the netting on which the spat collection is desired, without unnecessarily increasing the weight thereof, the resin before application to the netting may be treated to swell or foam sufficiently to harden in this condition. This may be accomplished, for instance, by whipping in an amount of air, or by incorporating in it an agent which gasifies in contact therewith. Applicant found that an additive of calcium chloride up to 100% of the weight of the resin produces good effects particularly with epoxy resins. The cement may be incorporated directly into the liquid resin in an amount up to the weight of the resin itself, prior to addition of the conventional catalyst. The cement aids in the polymerization process. This has been found to be an attractive cultch for the oyster spat.

The globule of resin, or resin-cement composition before hardening may be additionally coated with dry uncured commercial $CaCO_3$ such as Portland cement, this coating simultaneously serving as a drying means of the globule, facilitating quicker hardening and subsequent handling and also increases the surface of the globule and makes it porous, which is a desirable property of the cultch. The subsequent immersion of the netting with the globules into water for spat collection cures the dusted on surface cement and apparently penetrates into the depth of the globule, producing a homogenous hard porous cultch structure. Oyster shell fragments may be used by themselves or as an additive to the surface dust of the polymerizing globules. The hardened resinous globule on the netting, whether it contains cement or not, easily retains a coating of liquid cement slurry, while the rest of the net, when made of nylon, for instance, rejects it.

The globules preferably are positioned strategically at the knotted intersections of the netting, thus again increasing their surfaces.

Satisfactory plastic resins are polyester resins such as polymers of glycerol and phthalic anhydride, the product of which may be copolymerized with a material such as styrene; phenolic resins produced by the condensation of a phenol with an aldehyde such as hydroxybenzene and formaldehyde; epoxy resins such as produced by the condensation of bisphenol and epichlorohydrin; and silicone resins such as a polymer formed from the polymerization of a mixture of a bifunctional silane such as dialkylsilanediol and a trifunctional forming material such as alkyltrichlorosilane.

The impregnated finished fabrics saturated with premixed cement and/or covered with cement are sandwiched in tissue paper or other dissolvable material, or sprayed with resin, adhesive, paint, or similar protecting material.

(2) The fabric is drawn through a calender to apply an adhesive and the cement is dusted on by blowing, spraying, or by repeated calendering.

(3) The cement is cured on the fabric during application by a wet method and the fabric is rolled up with interposed layers of paper to prevent adhesion of adjacent layers.

In each of the above instances, preferably only alternate lateral sections of the fabric are treated with cement, leaving adjacent lateral sections in a flexible non-cemented state, to permit bending and rolling of the solidified textile in a continuous length upon the drum. To produce a continuous strip of such a fabric on the calender a split roll conventional in the textile production is used. The roll is divided into sections with spaces in between, dividers. Adhesive is fed on the roll section and the spaces in between remain untreated. This manner of treating fabric is conventional in the printing industry. Thereafter cement is dusted on the fabric, and it will stick to the lateral portions covered by the adhesive. The spaces in between remain free from cement. The dusted fabric is wetted, for instance, by spraying or immersion and the cement will cure in a conventional manner.

The result is a fabric having parallel portions hardened with cured cement and the like, and spaces in between flexible, because untreated. Thus the fabric is folded in accordion strips or rolled over the drum or unrolled, without breaking the hardened portions. Such a fabric has elastomeric properties or with alternate rigid and flexible strips.

In a preferred exemplary embodiment the invention is practised as follows:

A length of impregnated net material 21, provided at one end with anchor and buoy is unrolled or unfolded from the rear of a moving boat into the oyster spawning area. This is done over the endless belt 19, with the cylinder running in reverse. An anchor and a buoy are attached at the other end of the net after it has been stretched in the ocean. The nets are arranged in parallel, closely spaced preferably vertical rows over the spawning grounds. The oyster spat settles on the fabric using it as a cultch and within one to three months develops into seedling size oysters. At such a time the oyster-seeds are harvested by picking up one end of the oyster cultch on the conveyor 19 and directing automatically the cultch through the stamping drum 2 into the seed compartment below the drum. As the net fabric 21 emerges from the water, being drawn into the vessel over roller 15, and into the cutter 2, its alternate strips aligned parallel to the roller and the cutter already are solidified by the long exposure to water. Thus the net is shown having a succession of stiff and flexible portions 21A and 21B respectively, rolling over roller 15 into the cutting edges of drum 2, preferably in a spacing which will cause engagement of the cutting edges 3 with the flexible, unsolidified portions of the net.

The net with oyster-seed grown over it is cut, for instance, into crosses or squares 24, as shown in FIGURE 1. Short lengths, angles, U's, hexagons, or other conformations may be used instead.

Another method of growing and separating oyster seed on a large scale mechanically is to suspend a single line of cultch material 21, FIGURE 3, over the seed spawning grounds and of drawing it by conventional mechanical drawing means into the vessel at 26 through a well known die 27, the orifice of which is approximately the same diameter as the line 21. An alternate method is to submerge a line of beads 24a of cement, ceramic or the like as shown in FIGURE 4 and separate the beads from the line with oyster-seed on them by drawing them through the stripping die 27 of FIGURE 3.

The oyster-seed attached to the line will be stripped off and fall into the seed compartment 28, to be reseeded.

After having harvested the seed, the vessel may simply be changed into an ocean-seed-drill, FIGURE 5, by removing or lifting the drum, by substituting for the endless belt 19 one, 29, having longitudinal compartments 30, pockets or buckets of a type conventionally used for conveying granulated materials, such as crushed ore, and by pivoting the conveyor over braces 18 upward and backward with the cylinder 15 into the oyster-seed compartment. Then by reversing the direction of revolution of cylinder 15, each shovel 30 of the conveyor 19 will pick up an equal quantity of oyster-seed and will distribute it in controllable quantities overboard to the ocean bottom in symmetrical spacing (FIGURE 5).

Another manner of seeding the oyster cultch is to thread cut cultch squares 24 spaced over a durable wire or cable 21, and lay the cable in the ocean as an artificial bed. In this case the harvesting of the mature oyster is done simply by picking up one end of the cable and pulling it into the vessel through a die which will strip the oysters off, in the manner shown in FIGURE 6.

Another manner of seeding the cultch, shown in FIGURE 7, is to use a strip of durable netting 31 with a large mesh, provided with hooks 32 symmetrically spaced over it, of conveying the fabric through the previously acquired seed squares in the seed compartment 28 and of pulling the cultch out over the stern of the vessel by conveyor 19, running in reverse. As the fabric runs through the seed in the vessel, the cultch squares slip over the hooks and the fabric is laid out on the ocean bottom with cultch evenly spaced and hooked over it. After 2 years the harvesting of the oysters is then simply accomplished by lifting the net on board again by conveyor and taking of the mature oysters. Such a method eliminates the present cumbersome and wasteful hit and miss methods of dredging for oysters. An alternative method of oyster farming comprises the steps of suspending a continuous length of the net disclosed above, provided at spaced points with cultch medium, in a mollusk-spawning area to permit spat collection thereof, and of subsequently transferring the net with spat collected thereon to growth and fattening-promoting arears in sequence, and of harvesting the oysters at maturity on and with net.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

The present application is a continuation-in-part of applicant's U.S. patent applications S.N. 637,545, now Patent No. 2,922,393, and S.N. 738,410 and the benefits of the earlier filing dates are claimed in accordance with 35 USC 121 and MPEP Sect. 201.11.

I claim:

1. An article for mollusk propagation by submersion in a mollusk growing area comprising a length of a flexible strand and a plurality of solid globule-like cultch portions at spaced intervals thereon, forming a unitary body integral therewith, whereby mollusks attached to said cultch portions may be transplanted on and with said line from oyster-spat grounds to oyster fattening grounds and whereby mollusks may be separated from said line by drawing said line through a die of a shape and diameter slightly larger than the shape and diameter of said line.

2. An article for mollusk propagation as in claim 1, including oyster seed grown on said cultch portions.

3. An article for mollusk propagation as in claim 1, including a die of a diameter slightly larger than the diameter of said strand and means supporting said die in fixed position and operatively associated with drawing means to permit passing of said strand in stripping contact therethrough.

4. An article of mollusk propagation as in claim 3, including means for drawing said strand in contact with said die.

5. An article of mollusk propagation comprising at least one length of a flexible strand and a plurality of cultch portions as claimed in claim 1, said at least one strand including materials selected from the group of materials producing a smooth glassy surface, fiberglass, polymerized resins and nylon, said clutch portions including materials selected from the group of thermosetting materials, polymerizing materials and thermoplastic resins.

6. An article of mollusk propagation comprising at least one flexible strand and a plurality of cultch portions as claimed in claim 1, said cultch portions including a resin-cement composition.

7. An article of mollusk propagation as claimed in claim 6 said cultch portions including a dry uncured $CaCo_3$ coat thereon.

8. An article of mollusk propagation as claimed in claim 6, said cultch portions including oyster shell fragments.

9. An article of mollusk propagation as claimed in claim 6, said cultch portions including hard particles protruding therefrom.

10. An article of mollusk propagation as in claim 6, said cultch portions including epoxy resins.

11. An article of mollusk propagation as in claim 6, said cultch portions including hardened foam resin.

12. An article of mollusk propagation as in claim 6, said cultch portions including calcium chloride.

13. An article of mollusk propagation as in claim 6, said cultch portions including silicone resins.

14. An article of mollusk propagation as in claim 6, said cultch portions including polyester resins.

15. An article of mollusk propagation as in claim 6, said cultch portions including phenolic resins.

16. An article of mollusk propagation as in claim 6, said cultch portions including mineral and metal salts in at least traceable amounts, as oyster growth promoting material.

17. An article of mollusk propagation as claimed in claim 6, said cultch portions having elastomeric properties.

18. An article of mollusk propagation as in claim 1, said cultch portions including ceramic material.

19. An article of mollusk propagation as in claim 6, said cultch portions including metacrylates.

20. An article of mollusk propagation as in claim 6, said cultch portions including a styrene.

21. As an article for mollusk propagation by submersion in a mollusk fattening area, a flexible strand section, at least one solid globule-like cultch portion forming a unitary body integral therewith and mollusk seed attached to said portion.

References Cited in the file of this patent
UNITED STATES PATENTS

| | | |
|---|---|---|
| 1,933,950 | Wells | Nov. 7, 1933 |
| 2,144,980 | Johanson | Jan. 24, 1939 |
| 2,181,882 | Flower | Dec. 5, 1939 |
| 2,183,722 | Newman | Dec. 19, 1939 |
| 2,319,170 | Toner | May 11, 1943 |